E. A. WILCOX.
PNEUMATIC CUSHION FOR AUTOMOBILES.
APPLICATION FILED FEB. 12, 1914. RENEWED MAR. 26, 1915.
1,140,645.
Patented May 25, 1915.
2 SHEETS—SHEET 2.
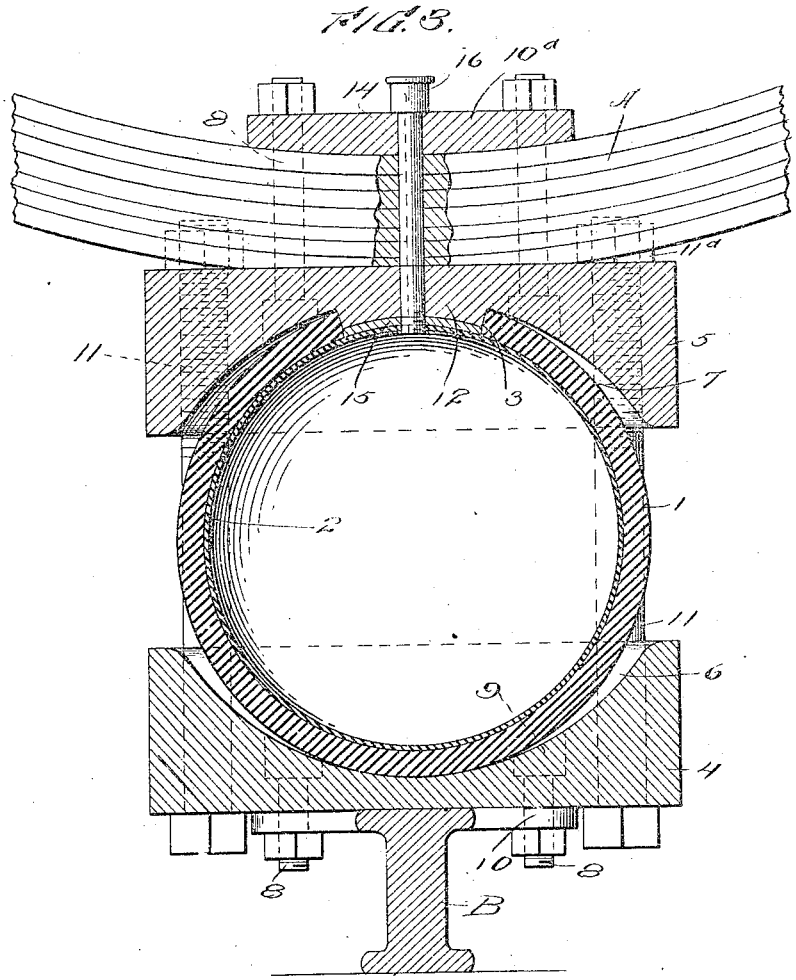
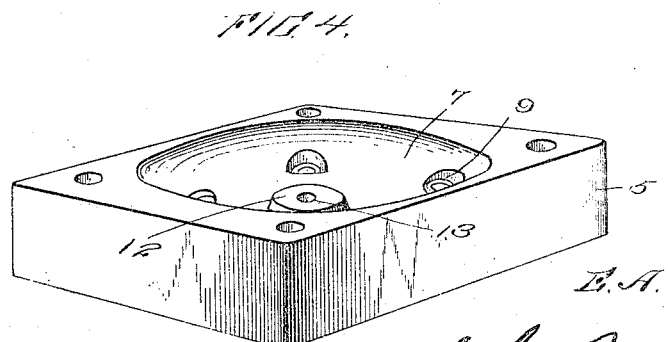

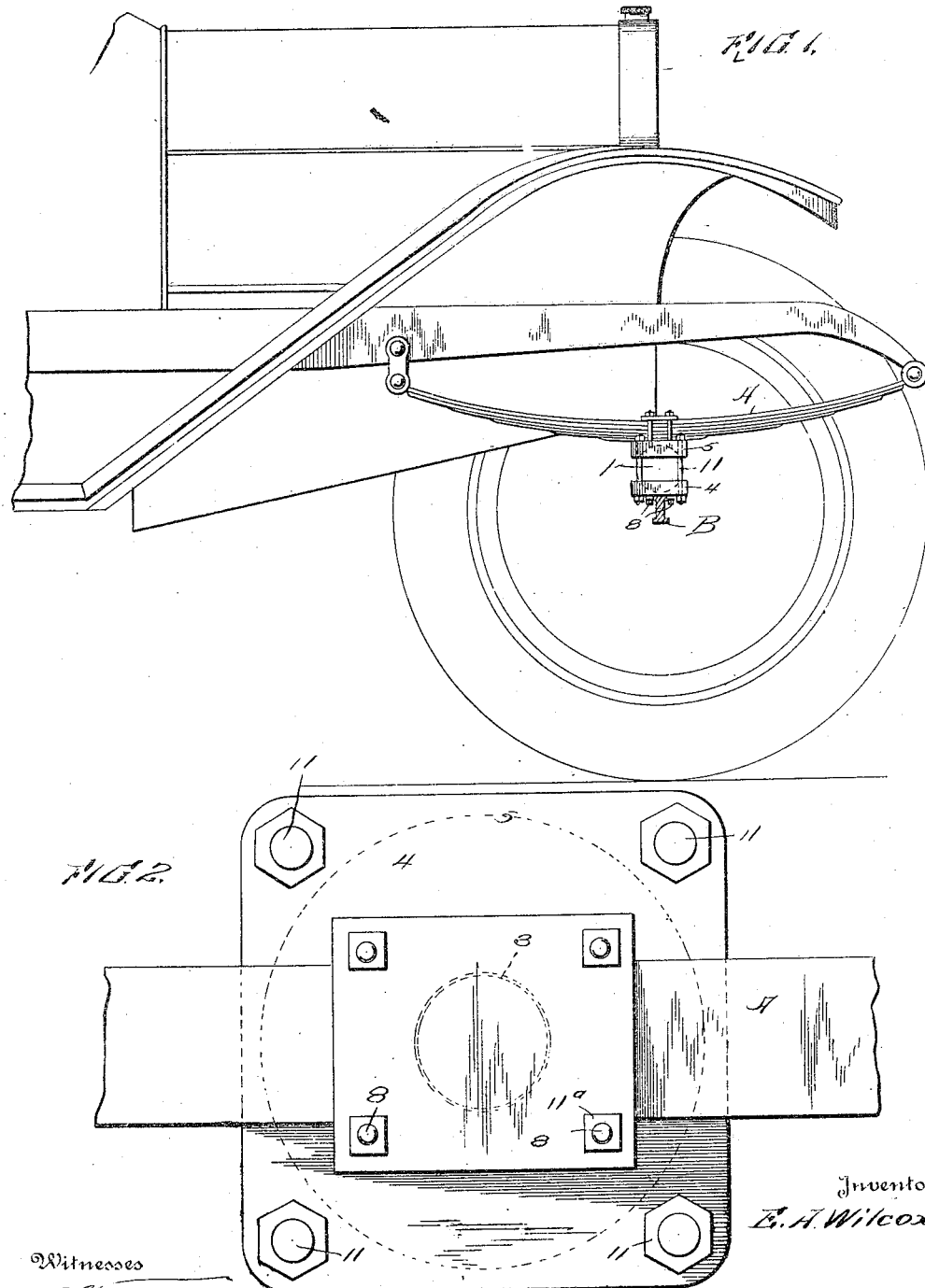

UNITED STATES PATENT OFFICE.

EDWARD A. WILCOX, OF CARTHAGE, ILLINOIS.

PNEUMATIC CUSHION FOR AUTOMOBILES.

1,140,645.           Specification of Letters Patent.      Patented May 25, 1915.

Application filed February 12, 1914, Serial No. 818,316. Renewed March 26, 1915. Serial No. 17,237.

*To all whom it may concern:*

Be it known that I, EDWARD A. WILCOX, a citizen of the United States, residing at Carthage, in the county of Hancock and State of Illinois, have invented certain new and useful Improvements in Pneumatic Cushions for Automobiles, of which the following is a specification.

This invention relates to improvements in automobiles generally, and more particularly to pneumatic cushions therefor.

The invention has for its object primarily, to overcome the highly objectionable features attaching particularly to the type of automobile pneumatic tires now generally in use.

A further object is to provide for dealing with this class of tires so as to compensate for the shock and rebound action consequent upon the use thereof.

A still further object is to carry out the aforesaid ends in a simple, expeditious and effective manner and with facility.

The invention therefore consists of certain instrumentalities and features of construction substantially as hereinafter fully disclosed and defined by the appended claim.

In the accompanying drawings is illustrated the preferred embodiment of my invention, wherein it will be understood that various changes and modifications may be made as to the detailed construction and arrangement of parts without departing from the spirit of the invention and in which drawing—

Figure 1 is a fragmental side view of the forward axle and adjunctive parts of an automobile of the heavy type, with my invention applied thereto. Fig. 2 is a detached plan view of my invention upon an enlarged scale. Fig. 3 is a sectional elevation thereof interposed between the leaf-spring and axle of an automobile. Fig. 4 is a detached perspective view of the upper bearing member used in connection with my pneumatic cushion in inverted position.

In putting my invention into practice, I employ an outer spherical hollow member or cushion 1 of substantial resilient texture or heavy fibrous rubber or other suitable material and an inner air inflatable or pneumatic member 2. The inner inflatable member 2 is suitably introduced into the outer spherical member 1 through a preferably circular opening 3 in the upper part of the latter, of course, in a non-inflated condition, it being subsequently or after insertion inflated, as will more fully later appear.

The spherical member or cushion 1 is held between two bearing members or cups 4 and 5, dished out or formed with concavities 6 and 7 respectively, to conform to the general contour of the opposed surfaces of the spherical member or cushion. These cups or bearing-members are formed of solid metal blocks, the concavities or depressions to be only of a depth to hold the spheres effectively or securely in place. These bearings or blocks are suitably bolted or fastened to the axle and body of the vehicle, the method of doing which may be varied to suit the different vehicles or the different axles of the same vehicles. The disclosure shows the plan of attachment to the front axle of the heavier type of automobiles, namely, by suitable nut-equipped bolts 8, with their inner headed ends let into sockets 9 in the blocks, themselves being inserted through passages in the latter and plates 10, 10ª against which are screwed or bear the nuts of the bolts, the plate 10 being integral with the axle B.

The blocks or bearings 4, 5 are connected together and thus held in suitably assembled position or relation with respect to the cushion or sphere 1 by means of nut-equipped bolts 11 threaded in the upper block 5, its entire thickness, and extended freely or unthreaded through the block 4 to allow of freely vertical play of the bolts therein. The upper ends of the bolts 11 are equipped with suitable lock-nuts 11ª for apparent reasons. The top or upper bearing member or block 5 has a depending or downwardly extending portion or projection 12 to fill in or " stopper " the circular opening 3, in the cushion 1, as will readily appear.

Through a vertical passage drilled through the vehicle spring A, the member 5 and the depending " stopping " portion 12 thereof extends a tube 14 equipped with the usual valve and stem and connected to the inner inflatable member 2 and through which tube the latter may have pumped therein air, as in inflating said member, as will be readily understood. The inner end of the air-conducting tube 14 is secured in position by suitably applying thereto or seating the same in a metallic washer or plate 15 let into the cushion or member 1, while to the outer end of said tube for securing it in place at that point, is applied a screw-cap 16.

It is believed from what has been adduced the advantages and benefits of my invention have been made apparent, it only being necessary to remark, however, that when a disturbance or shock occurs or takes place at the surface, it will be received upon the absorber including the resilient spherical member or cushion 1 reinforced resiliently by the inner inflated member 2, and accordingly be absorbed thereby and its influence thus be arrested before it would otherwise reach the body or "riding" part of the vehicle. Thus the riding action of the vehicle is rendered even and smooth, the discomfort to the occupants thereof which would otherwise result is avoided and the wear and tear upon the machine is reduced to the minimum.

I claim—

A vehicle of the type described including a resilient hollow spherical member, upper and lower concaved members applied to the corresponding surfaces of said resilient member, an inflatable resilient member within the first named resilient member, said upper concaved member having a central depending portion serving as a stopper or plug for the orifice in the upper portion of said spherical member, through which said inner resilient member is inserted, and upper and lower concaved members applied to the corresponding surfaces of said first named resilient member, said upper and lower concaved members being applied to the axle and vehicle body, respectively.

In testimony whereof I affix my signature in presence of two witnesses.

EDWARD A. WILCOX.

Witnesses:
 CHAS. S. TYLER,
 BURTON P. CANNON.